US009450948B2

(12) United States Patent
Artishdad et al.

(10) Patent No.: US 9,450,948 B2
(45) Date of Patent: Sep. 20, 2016

(54) METHOD FOR SECURELY SEARCHING, FINDING, REPRODUCING, RECOVERING, AND/OR EXPORTING OF ELECTRONIC DATA

(71) Applicant: ARTEC COMPUTER GMBH, Karben (DE)

(72) Inventors: Jerry John Artishdad, Karben (DE); Christian Hett, Niddatal (DE)

(73) Assignee: Artec Computer GmbH (DE)

( * ) Notice: Subject to any disclaimer, the term of this patent is extended or adjusted under 35 U.S.C. 154(b) by 98 days.

(21) Appl. No.: 14/358,451

(22) PCT Filed: Nov. 14, 2012

(86) PCT No.: PCT/EP2012/072616
§ 371 (c)(1),
(2) Date: May 15, 2014

(87) PCT Pub. No.: WO2013/072365
PCT Pub. Date: May 23, 2013

(65) Prior Publication Data
US 2014/0317412 A1    Oct. 23, 2014

(30) Foreign Application Priority Data
Nov. 15, 2011 (EP) .......................... 10 2011 055 384

(51) Int. Cl.
*G06F 21/00* (2013.01)
*H04L 29/06* (2006.01)
*G06F 21/62* (2013.01)
*G06F 21/44* (2013.01)

(52) U.S. Cl.
CPC ......... *H04L 63/0823* (2013.01); *G06F 21/445* (2013.01); *G06F 21/6218* (2013.01)

(58) Field of Classification Search
CPC ................................ G06F 21/31; G06F 21/44
USPC .......................................................... 713/175
See application file for complete search history.

(56) References Cited

U.S. PATENT DOCUMENTS

2004/0064693 A1* 4/2004 Pabla ...................... H04L 63/02
713/168

(Continued)

OTHER PUBLICATIONS

International Search Report dated Feb. 13, 2013; as issued in corresponding International Patent Application No. PCT/EP2012/072616, filed Nov. 14, 2012.

*Primary Examiner* — Christopher Brown
(74) *Attorney, Agent, or Firm* — Roger D. Emerson; Emerson Thomson Bennett

(57) ABSTRACT

A method for securely searching, finding, reproducing, recovering, and/or exporting electronic data from at least two systems which can be found in a network and which are organized in a functionally identical and decentralized manner. The individual systems include a system certificate and a corresponding serial number by the manufacturer and can carry out an authentication process using said system certificate and serial number. Information is provided on user authorizations between the systems using configuration tables which are stored on each of the systems. A maximum level of security is ensured by combining cryptographic methods and the mutual authentication of the involved systems. A user interface is provided for the user, wherein the user receives a pre-selection of the requested electronic data in the user interface and can then mark the pre-selection for further processing.

15 Claims, 1 Drawing Sheet

(56) References Cited

U.S. PATENT DOCUMENTS

2004/0122958 A1* 6/2004 Wardrop ........... G06F 17/30206
709/229

2008/0028017 A1* 1/2008 Garbow ............... G06Q 10/107
709/201
2011/0113042 A1* 5/2011 Green ............... G06F 17/30126
707/749

* cited by examiner

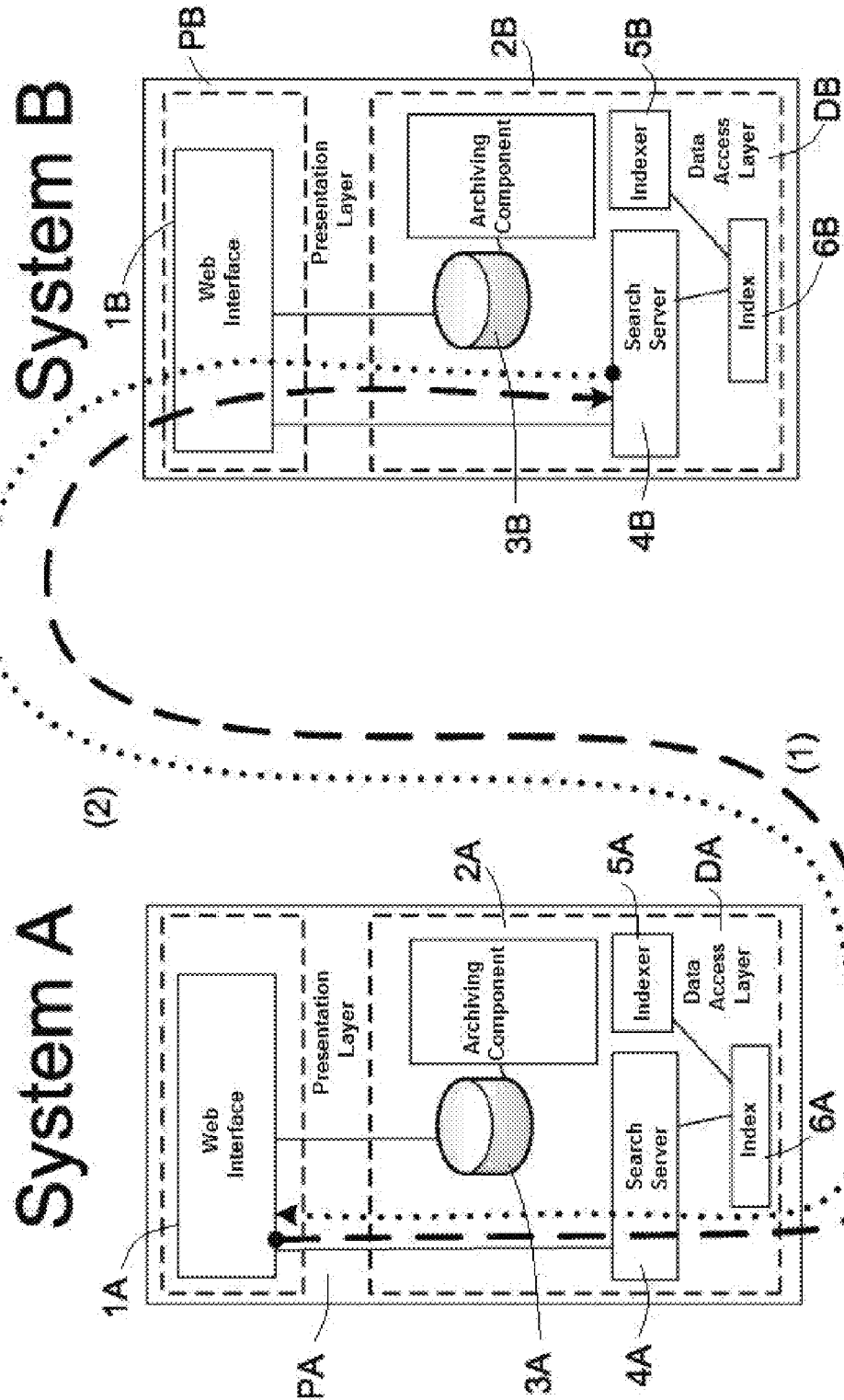

METHOD FOR SECURELY SEARCHING, FINDING, REPRODUCING, RECOVERING, AND/OR EXPORTING OF ELECTRONIC DATA

CROSS REFERENCE TO RELATED APPLICATIONS

This application is the US-national stage of PCT application PCT/EP2012/072616 filed 14 Nov. 2012, published 23 May 2013 as WO 2013/072365, and claiming the priority of German patent application 10 2011 055 384.3 filed 15 Nov. 2011.

FIELD OF THE INVENTION

The present invention relates to a method that serves for secure searching, finding, reproducing, recovering, and/or exporting of electronic data. In particular a method that makes it possible to capture data in a network of systems that are identical in terms of functional scope and decentrally organized, and provide it to one or more users.

BACKGROUND OF THE INVENTION

According to the prior art it is known that electronic data can be practically processed using corresponding databases and electronic data processing systems. In the classical sense there is a so-called "client-server model" in this case, wherein the client makes an inquiry, a so-called request, to a service of the server and waits for the answer from the server, the so-called response, before the client makes use of the service of the server. The areas of application of the respective database are, as a rule, matched to the requirements of the application.

For some time however, a completely new concept in information technology has been opening up: so-called "cloud computing." The concept of this development promises high potential, because software and data are no longer processed or stored locally, but rather in a completely external and complex infrastructure. With this emerging technology it is also possible to store complete hardware and software systems in the so-called cloud and thus provide the necessary IT services in real time as services via a network, such as for example the Internet, and be charged according to respective usage. Of course this "outsource technology" harbors not only advantages, but also disadvantages, which have great impact in the context of data security and reliability.

Due to modern business and office structures, work done in a network has become one of the pillars of business success, and consequently doing without these structures and the associated hardware and software is no longer conceivable, or conceivable only with difficulty. As a rule the largest part of all office work today is performed via electronic data processing systems in combination with a plurality of programs and systems.

Electronic correspondence forms an essential component of communication in business and office life, wherein a suitable email program in conjunction with an input device such as for example a computers, laptop, BlackBerry system, tablet PC, etc. is a fixed component of modern communication. Of course not all information structures of modern office work are covered by modern electronic communications means, and it is thus understandable that in addition, the classic postal letter and fax continue to occupy a thoroughly respectable position in nearly every business- and office-structure.

It is also hardly surprising that due to new and modern possibilities for data acquisition and archiving, optical character recognition (OCR for short) has been introduced as a connection between modern data processing and the classic letter/fax.

In this case, in addition to the classic archiving systems, such as filing cabinets and the corresponding introduction of identification elements, e.g. file numbers or similar, the document in question is scanned using a suitable external peripheral device and automatic text recognition and optionally automatic text correction is carried out by so-called OCR software. The document, which now exists in electronic form, can now of course be incorporated into already-existing archiving systems, or sent worldwide by electronic mail as an attachment without delay. The described "electrification" of classic business data makes a method of electronically archiving data essential in the modern office.

Here suitable IT infrastructures enable the archiving of any data arising in the course of ordinary business, such as e-mails, telephone conversations, etc. The possibility to integrate, for example, postal correspondence and faxes into an electronic archiving or data system as well is completely possible as seen in the above description.

A basic advantage of such an archiving system for electronic data is the fact that a replica is generated of the electronic data in their entirety and correspondingly stored in the electronic archive. This standardized methodology now allows, independently of the respective client's operating system, all-encompassing securing of the electronic data, which ensures high reliability due to the archiving of the replicas. As a rule these protected replicas are recoverable at any time, and thus in the case of a client-failure, the last known state of the electronic data can be immediately recovered.

In order to fully exploit the possibility of electronic archiving, however, additional appropriate IT infrastructures are needed that make it possible to access previously archived data and not only find specific data once again via this infrastructure, but also ensure to the respective user that these requested data will be made available in processed and readable form. Given that, depending on company size, this archive can now reach corresponding dimensions, the internal organization of the archive, as well as the simplicity of recovery of requested data play a significant role.

Since the full scope of all electronic data in an enterprise that is comprised of a combination of different technical systems, which are primarily independent, electronic systems, cannot be readily determined on an ad-hoc basis, this presents a considerable challenge for IT infrastructure.

However, if the required electronic data is not located either at the local workstation (client) or in the archiving system provided for the workstation, the worker concerned has no choice but to try to find the required data through inquiry and research. This research is not infrequently very time-consuming, and for example in enterprises that operate globally, it is not worthwhile simply due to the distances involved, because the result is in no proportion to the effort required. However, precisely such research might be required, and a corresponding uneconomical level of productivity has to be accepted.

Due to a globalization of the enterprise and the decentralization of locations associated therewith, it must thus be taken into account that the information flow in this sphere might be additionally restricted in the future, and the above-mentioned uneconomical level of productivity might have to be accepted on a permanent basis. Here massive disadvantages obviously result from the prior art, the disadvantages becoming manifest in that the above-mentioned structures per se must have a central data processing system, or they will possess little reliability be with respect to security technology. With such globalization of an enterprise, experience has shown that in enterprises that operate worldwide, and that also operate a plurality of geographically distributed branches and subsidiaries, problems can result with respect to the storage and distribution of data pursuant to the respective laws of the respective countries. For example, problems result in connection from the directive 95/46/EC for the protection of natural persons in data processing of personal data and free movement of data, as this directive, for example, includes a basic prohibition on the transfer of personal data from EU member countries to countries that do not have a data protection level equivalent to EU law. The central tenet here is the storage location of the respective data.

A further aspect of the task is of course to use already existing infrastructure in combination with the prevailing current and future standards and thus provide a method that, a few years from now, will also allow fast and as far as possible uncomplicated handling for the user, which nevertheless, however, forfeits none of its security and can be expanded at any time without major effort.

This task is far from accomplished by the state of the art, as it is either handled via a client-server system, and thus has a central data processing location, which can in fact be implemented redundantly, but that is nevertheless not immune to external attacks, because if there is a successful attack on the server system, the remaining system will no longer able to operate. The situation is similar with the previously mentioned cloud solution, wherein all data and the corresponding software itself are partially or completely stored in the cloud solution. With respect to data security, this also does not appear to be an ideal solution. The basic expense that would have to be incurred in order to make data secure in this prior art, to ensure reliability, and above all to allow for expansion, is exorbitant. It is known from experience that with the method, existing infrastructure must be adapted when the structure is enlarged, at significant expense and corresponding cost in terms of time in order to ensure problem-free operation for the user. This kind of guarantee will often require an all-around adjustment of the complete central information management system, which will involve a significant amount of additional effort and possibly problems with respect to integration into the existing system. On the other hand, for example, a migration of partial systems also generates massive problems with respect to effort. In a case of migration, the centralized complete data would have to be separated and suitably further processed. In this respect, selling part of the company, including the corresponding electronic data, might be a viable solution, also in view of the financial expense of the separation of the centrally stored data.

It is known from the prior art that central data processing locations are currently used to manage client-server systems and supply the respective clients with appropriate information by means of centralized servers. Some massive disadvantages obviously result from this centralization. Thus, during maintenance, adequate replacements must be provided, or the time at which maintenance is carried out must be adapted to normal working routines. In enterprises that operate worldwide, this alone can lead to massive problems, such as for example that of finding a maintenance window that will work on a global basis. Unforeseen system damage can, at worst, lead to a prolonged drop in the productivity of the enterprise and would involve major and corresponding financial strains. The cited system damage could for example result from active attacks on the centralized server, from the failure of a centralized system, or from the failure of a data service. In principle, however, in each case, the entire system would be affected by the malfunction, and maintenance or data recovery could in such cases be very cost-intensive. Even an expansion of the system could lead to significant difficulties for ongoing operation.

OBJECT OF THE INVENTION

Against this background it is the object of the present invention to provide a method that makes it possible to search, find, reproduce, recover, and/or export electronic data or archived electronic data that is stored on at least two connected systems that are identical in functional scope and decentrally organized.

SUMMARY OF THE INVENTION

A method was found of securely searching, finding, reproducing, recovering, and/or exporting electronic data from at least two connected systems that are identical in scope and decentrally organized, the method comprising at least the following process steps:

a. Encrypted query for the requested data between at least two systems that are identical in functional scope, each of which has a layer model and is comprised of at least a presentation layer and a data access layer, b. Authentication of the provided search query and/or of the user, which is checked by the presentation layer of the queried system, c. Carrying out of the authenticated query, d. Checking of the result and encrypted transmission of the relevant requested data, and e. Display and/or further processing of the requested results.

BRIEF DESCRIPTION OF THE DRAWING

The sole FIGURE of the drawing is a schematic diagram of the invention.

SPECIFIC DESCRIPTION OF THE INVENTION

As can be seen in the drawing, the layers, which in this exemplary embodiment are embodied from the presentation layers PA or PB and data access layers DA or DB can contain a plurality of components. The data access layer D can for example be comprised of an archiving component 2A, a database 3A, a search server 4A, a system for indexing 5A, and an index 6A. This combination of components results from the requirements of the respective system and is thus not to be seen as limiting. the drawing further shows the schematic, inventive system, which for example is comprised of System A and System B, which are in principle formed as functionally identical in scope. The respective system, e.g. System A, located in the integrated system, comprises at least one presentation layer PA, which is preferably connected to the data access layer DA. As can be seen, for example, in the drawing, the presentation layer PA is connected to a database 3A. There is further an advantageous connection to the search server 4A that in turn can access an index 6A. The index 6A itself is not only read by the search server 4A, but can also be written to by the indexing component 5A. As can be seen from the drawing, this basic structure also applies to the other respective systems in this integrated system. The schematically illustrated design of two systems also has the respective query 1 from system A to system B, as well as the corresponding response 2 from system B to system A, which have also been schematically illustrated in the drawing.

In principle an encrypted transport protocol such as for example HTTPS is used in the inventive method. As an example, HTTPS has the advantage that it protects all transmitted data against eavesdropping and alteration per se by symmetric encryption and HMACs (Keyed-Hash Method Authentication Codes, whose structure is based on a cryptographic hash function). A further advantage of the use of HTTPS, which here of course will only be cited as an example, is that it creates a session key that, depending on the protocol variant chosen, is destroyed after the termination of communication and thus also subsequently gives no information about the content of the respective encrypted communication. In addition, data are not only encrypted, but also, for example, protected from alteration, since the internal sequence of the data is backed up, and thus data content can neither be switched nor removed. With a protocol such as for example HTTPS, a standardized and effective cryptographic securing of the data would thus be achieved. In the inventive method, HTTPS should preferably be used, since this is an established industry standard whose security is comparable to a VPN technology such as for example IPsec. Of course the use of HTTPS consequently entails some advantages that ensure secure and robust operation of the method. The preferred design in HTTPS should however not be seen as limiting, since in principle any encrypted transport protocol could take the place of HTTPS, and this only represents a preferred form of design.

The security aspect that, for example, cannot be achieved via an encryption is that of the authentication of the respective systems or of the user. The inventive method is in principle based on all connected systems being mutually distrusted. Due to this basic distrust, a security standard is provided that is based on the fact that even with a compromised system, access to the corresponding other systems is only possible within the respective scope of authorization. In the invention presented here, preferred certificates are used that, for example, are managed using a "public key infrastructure" and the corresponding combination of certificates and associated private keys. As a rule, such a system contains a private key and a certificate having a public key. This certificate is signed by a certification authority, for which purpose this in turn uses its private key. The public certificate of the certification authority (root certificate) is made generally known, so that anyone can check the certificate. An important aspect here is that the server addresses and names, as well as further attributes contained in the certificates, cannot be altered or manipulated by the user, since these are signed using the private key of the root certificate.

In principle, each system of the inventive method is given a unique serial number during production by the manufacturer. Preferably the manufacturer can operate a certification authority that automatically issues a certificate to the respective system during manufacture. In order to ensure maximally secure access to the system, it is in general particularly advantageous that access to the web interface can be carried out via HTTPS, and in this respect an advantageously embodied certificate can be used, which for example can already be installed on the device by the manufacturer. Since at the time of manufacture it is as a rule not yet known into which environment the system will be integrated, it is advantageous if this certificate is an intermediate certificate, which can be used by the system itself to generate and sign a specific certificate when the certificate is attached to its destination or its destination domain. One or more IP addresses or DNS names from the intermediate certificate can be processed, for example, by the system such that a fully valid certificate is created from the stored intermediate certificate upon integration into an existing network, via which network an HTTPS-secured web interface can be provided.

In an advantageous embodiment, the manufacturer can already provide the respective certificates with corresponding serial numbers. In a subsequent integration of a system without a corresponding certificate, this certificate can moreover be readjusted in the context of an update. It can be uniquely regenerated by the manufacturer, and using a database flag, it will be ensured that this is only possible once per system, and thus any misuse can be ruled out. Since the private key that is used for issuing the certificate is exclusively in the possession of the manufacturer or a certification authority of the manufacturer, no serial number can be altered or modified by the user himself. Based on this serial number, which can only be assigned by the manufacturer, a secure authentication is possible. For an attacker, it is thus not possible to compromise this serial number in a manner advantageous to him. Furthermore, this also results in the possibility that this certificate can also be used in conjunction with HTTPS as a so-called "client certificate." This can for example be used for authentication on another system. However, for this purpose, an additional certificate can also be used, for example, which advantageously has a serial number for the authentication, the serial number being very advantageously generated by the manufacturer of the system during manufacture. This certificate can however also be submitted later, for example in the context of an update.

This advantageous design form also makes it possible to integrate exchange systems, which replace defective systems or systems undergoing maintenance such that the exchange system can be integrated without concerns about security or additional effort. For this purpose, the manufacturer must essentially introduce the corresponding certificate into the respective system prior to the integration of the corresponding system. These certificates advantageously contain the corresponding serial number, and the respective system can thus be integrated simply into the network. This new certificate now contains an original serial number, so that it can, for example, use the original serial number for the certificate in an exchange system or a standby system without further problems.

Of course a system that is used, which might come from another network, can also be inserted into the network without an unauthorized system having access to the network. An advantage of this design of the invention is the fact that the exchange of keys, passwords, or certificates is not absolutely necessary, since all necessary data can be adjusted, for example using a configuration table.

If system A now wants to connect to system B during a query, system A can then check via the intermediate certificate whether the system that has been connected to it is in fact system B. After the checking of system B by system A has been concluded, system A can be certain that it is communicating with system B. Subsequently system A authenticates itself with respect to system B during further establishment of the HTTPS connection using its own client certificate. Now system B can also be certain that it has connected to system A and no other system of the network. This mechanism makes it possible for all further authorization checks to occur exclusively on the basis of the serial numbers, and very high security is ensured for the connection. It is guaranteed by the serial numbers of the system, which of course are deposited on all systems, that only the authorized systems can connect to each other. In practice these will be proprietary systems that might be distributed worldwide.

In principle the user administration should be structured as administrators and users, whereby the administrators as a rule can query all data of from users, while users can respectively query only their own data. However, in this case administrators might also be limited in their queries in that they might only be allowed to query data, for example, over a specific period of time. The goal here must always be to provide both users and administrators with the information in the search network that is respectively relevant to them, and correspondingly to provide them with the respective access rights.

There must be a configuration table for every system in the network that assigns data to every other system in this network. An individual configuration table of this type can for example contain the following data:

Serial number of system B;
IP/DNS address under which System B is reachable for system A;
Whether system B is only reachable via a proxy server;
Chosen name of system B that when a search is conducted can be released as a result;
Tooltip;
Icon; that, for example, can contain a company logo or a country flag;
User account names, that here are allowed to make a query 1 without entering a correct password;
User account names that here can make a query 1 if a correct username and password have been entered;
User account names that here can make a query 1 if they have been identified by a so-called single sign-on query, i.e. a one-time query;
User account names that, when they are logged onto system A, automatically always query system B;
Administrator account names, that here can query if they can show correct user name and password of an administrator account to system A. For the part of the query that takes place on system A, the rights and query limitations that are defined for the administrator on system A are used;
Administrator account names that here can query if they can show an existing username of an administrator account on system A. For the part of the query that takes place on system A, the rights and limitations that are defined for the administrator on system A are used;
Administrator account names that can query here even if they do not exist. For the part of the query that takes place on system A, the rights and query limitations that have been defined for the administrator on system B are used. Here the rights and the globally unique identifier (GUID) of the administrator limitation is transferred with the login. If the administrator limitation does not exist under this GUID, the login fails;
Administrator account names that if logged into system A, can query system B as desired;
Administrator account names that, if logged into system A, automatically always query system B.

Of course dedicated account names can also be extended to all users by using placeholders. As a rule, one can thus find any combination of systems in each of a table row of the configuration table; there the named settings can then be enabled for "all," "none," or for explicitly named users and administrators.

A query process by an administrator would now for example appear as follows: The administrator 1 logs on to system A and opens the query page. The system A then determines from the configuration table on the system A which query options are available in general for the administrator 1. If the administrator 1 now for example carries out an enquiry 1 on a web interface 1A of system A, then the system A establishes a connection to the system desired or authorized according to the configuration table, which connection can for example be based on HTTPS.

Here it is checked that the correct HTTPS certificate of the respective system is presented, so that system A can be sure to send the query 1 to the correct systems, such as for example system B, and not to entrust an incorrect system with the query 1.

As soon as the connection arrives from system A, the authorized system, for example system B, will check the HTTPS client certificate of system A and match it against its own configuration table to see whether this system or systems are generally known and which authorization the respective users have on system A. The system A now logs on to system B via this HTTPS API (or all other systems involved) in the name of administrator 1. The system B checks this logon of system 1 according to the authorization and the requirement. If a password were involved here, this password would be checked as though the administrator 1 had logged directly onto the web interface 1B of system B. Moreover, in the configuration table of system B, the system A would also be recognized based on its serial number and the query rights of the respective user also retrieved by means of the entry in the configuration table. The system B now knows which rights the administrator 1 has if he is logged on to the system A and then makes a query 1 to system B. The system A can send a query via HTTPS (for example via port 442) directly to the system B. If a query is made from system A to a plurality of systems, these queries are of course sent simultaneously from system A to all those systems that might be queried in the context of this query. The system B now carries out the query and sends the result in pieces back to the system A, which assembles these pieces and presents them to the administrator 1. If this query for example deals with an email or a part of an email, and the administrator calls up a viewer for this email, which viewer is stored on system B, then system A sends a command to system B via the HTTPS connection and the corresponding session, which command the system B answers for example with header and body. In this way it is irrelevant on which system the data are stored, since with a result on another system this respective system would have reacted to the command for, for example, header and body.

From practice it is known that it can happen that due to their development, corresponding systems can be comprised of different components and different programming languages. With the inventive method this plays a subordinate role.

The inventive method makes it possible to carry out for example search queries 1 such that for example the user starts a query 1 from the web interface or the presentation layer PA and this is displayed in the presentation layer PA if there are enough results for a page (e.g. 50). By using for example PHP in the presentation layer PA it would not be possible to maintain the requests after the first results page, since PHP always destroys all data structures and open connections after processing each request and supports no continuously running background processes. Now it is advantageous to provide the structure of the respective system with a search server 4A or 4B. This search server 4A or 4B can continue running in the background with a query and terminate itself, for example, after a determined inactive time. Of course this has the major advantage that the language in which the interface is written and the disadvantages that language entails are irrelevant.

In the case of a search, the search server 4A or 4B can continue running in the background and search for and load query results from the index 6A or 6B. If the user now causes the first page to be displayed, the search server 4A or 4B continues searching in the background (until for example a maximum value of results is achieved, and as soon as the user calls up the next page of results, the search server 4A or 4B outputs the respective next results to the presentation layer PA. Of course this happens only until the maximum number of results is reached. If an individual system or a plurality of systems does/do not react to the corresponding query after a certain minimum reaction time, it is advantageous if, despite the fact that the complete query results are possibly not available from this system to the querying system, the available results are further processed. In such a case, there may, in the worst case, be incomplete query results; nevertheless it should be ensured that the available results are not discarded, and that the user receives displayed to him at least those results that have been found up to this point in time. The incompleteness of the result can be made known to the user by means of an appropriate notification.

The preferred use of HTTPS results in a further advantage that manifests itself in the use of "keep alive." This "keep alive" mechanism keeps a connection alive for a specified amount of time. If a new query is made within this time, the already-open connection can immediately be used without having to establish a new connection in a time-consuming manner and without having to negotiate a new session key or having to check a corresponding certificate. Using this design it is possible, using the search server 4B, to keep open and maintain this keep-alive-connection using a background process. As a result, all queries 1 from a system A to another system B or C etc. take place in the lowest "search server layer." Since the presentation layer PA or PB typically uses a plurality of processes for the queries, it would not otherwise be that easy to maintain the keep-alive principle there. Using the example of PHP it is clear that this would not be so readily usable. From practice it is known that for example the common script language PHP immediately destroys the corresponding connections after each request. Here for example a keep-alive would not be realizable, or only be realizable to a limited extent. Using the search server 4A or 4B, which keep these keep-alive connections open, this is possible with the present invention.

Thus, in detail, in a typical query 1 from system A starting in the presentation layer 1A of system A, a query 1 is made to the local search server 4A that first starts a local search in the local index 6A and simultaneously, for example, establishes an HTTPS connection, for example to the system B, and also sends this query 1 to system B. This query 1 is accepted in system B in the presentation layer 1B and there the logon procedure of the user from system A is checked as already described. If this check is concluded in the user authorized to make query 1, the query field is accepted. The presentation layer 1B of system B now establishes an internal connection to the search server 4B of its own system. If, at this point in time, this search server 4B has not yet been run, the search server will of course first be started, because otherwise it would not be reachable for the presentation layer 1B. The search server 4B of the system B now exclusively carries out a local search on system B and delivers the results, which are of course already authenticated via the previous authorization check between the system A and the system B. Of course a corresponding query limitation due to the respective user rights of the querying user is included, and thus the presentation layer 1B of the system B prepares the query result corresponding to the rights assignment and sends it back to the system A.

The local query itself is accomplished in two phases. In the first phase, the inverted indices 6A or 6B are scanned for the respective search terms. In this case search terms that are associated by Boolean algebra, such as for example "term_A AND term_B" are used, for example two pointers in the inverted indices 6A or 6B. These pointers locate the terms A and B. The related document numbers of all documents which respectively contain either term A or term B are now deposited in ascending order at these two locations. The search itself now respectively skips over document I.D.S. on the opposing list until both pointers have the same document ID. This document ID would now therefore be one wherein both terms, i.e. A and B, are contained, and thus relevant to the search.

Of course, due to the scope of the respective lists, the number of matches can be considerable. In order to offer the user more convenience in this respect, the respective result is provided with a score value that outputs a weighted result in the form of a value that suggests the number of relevant matches. The respective system processes these result pairs (consisting of the document ID and the respective score value) in order to thereby determine the best matches. The number of these results can be correspondingly limited in a useful way to, for example, 5,000 result pairs; simultaneously the number of relevant results is counted in order to elicit how many matches are relevant and how many thereof belong, for example, to the best 5,000.

In the second phase the search result records are loaded from the search index 6A or 6B. Subject, sender, recipient of an email can for example be noted in this search-result record. Of course the document ID must also be noted, without which a further access would of course be impossible. Here the previously described return of the search results again comes to bear, which for example sends back and displays the first 50 results and in the background loads the pending results via the previously described search server 4A or 4B or can then accordingly display these as needed without a new search having to be carried out. The corresponding sorting occurs in RAM since the index 6A or 6B is not in a position to do that. This query can of course occur not only between two systems (in this specific case, system A and system B); it can naturally also involve a plurality of systems.

In this respect each "queried" system delivers its results in, e.g., blocks of respectively 50 results. The data all appear consecutively and are separated by flush commands in order to mark the end of the respective block and initiate the transmission of the data by, for example, the HTTPS protocol directly and without delay. The flush command in principle serves to regulate the data flow and to empty the respective search buffer. In this way the existing connection is used in an ideal manner, and the data are delivered so to speak as a push-service when available to the querying system A.

As is easy to understand, massive problems between the data formats and data structures used can come about during the above described data transfer.

In order to be able to operate this method in a stable manner independent of programming language and data structures and similar, it makes sense if the presentation layer 1B of the respective local system, for example system B, passes on the data for the presentation layer 1A of the querying system A as already serially encoded in its typical presentation layer data structures and concepts, such as for example in PHP. The search server 4A of system A cannot process this data and simply passes it on to the presentation layer 1A of the querying system. Among other things, this brings the data into an appropriate form and transfers it to the respective local search server 4A or 4B. The data sent back are analyzed again by the respective presentation layer 1B and transmitted to the querying system A. However, depending on the query type, this can also be processed using an HTML code that is generated in the presentation layer 1B of system B and forwarded by the search server protocol 4A of the system A and its presentation layer 1A and can be appropriately outputted to the user.

Of course a plurality of tools for further processing can be integrated into the search result displays. It thus makes sense to integrate into the respective interfaces not only icons for requesting the selected data, but also, for example, download-icons for downloading an attachment if the search result for example pertains to a PDF attachment processed using OCR software. Further actions for the found and selected emails or documents should also be provided, such as for example erase, restore, forward, list export as CSV file, EML bulk export, or export as password-protected ZIP file.

The integration of a viewer, which can for example be integrated using a popup or displayed as a browser window plays a significant role in the further processing of the data that were found using the inventive method. With the integration of such an interface it is possible to again further process the results. In a possible design form, a print view is advantageously integrated, or a viewer, which for example with emails displays the header, the list of attachments, and the body. With HTML emails of course the respective HTML text can also be displayed. The viewer can also have buttons for "scrolling through" the results or to navigate to the first or last result respectively. A direct navigation to a specific result is also conceivable. Naturally the functions that are implemented here can be extended in numerous ways and adapted to the respective users, and should not to be considered as limiting.

With the inventive method, there is always emphasis n on working in a manner that conserves bandwidth as much as possible. As already described, the complete relevant data are not transmitted by the output of the query results, but rather only certain relevant parts. The user can thus make a pre-selection or a selection of the query results of interest to him. Thus, using certain tools the user can now further process the data that fit his search query. However, due to the amount of data, transmitting all search results directly to the user should be avoided. Instead it makes sense to allow the user to make a selection from a preview and then to transmit the data to the respective user in the same manner that was carried out in the query 1 only if the user really needs the data and he definitely requests it. This has the immense advantage that bandwidth can be conserved and used in an optimal manner, because only relevant data are then transmitted. Meaningless data transfer is prevented in this way and resources are optimally used. Moreover, a user preview of this type also gives the user the possibility to decide whether the search result is relevant to him or not. If that proves to be the case, using the inventive method, the user can send the relevant search results to, for example, his mailbox, using a recovery option.

Since now of course the export of results is also based on the basic idea of the inventive method, there is also the possibility to export relevant search results. Since the results may not always be comprised of a single result; it is also conceivable that the relevant results will consist of a large amount of relevant data, it would not be reasonable if the user had to manually save each individual result. Thus it makes sense to recover or export the results, for example using a ZIP export. With a ZIP export, the existing ZIP library is customized. The basic structure of a ZIP file, which can be used very well here for further processing of the results, is comprised per file of a header and trailer with filename, a compression method and a CRC checksum. These are lined up by file, and at the end of the process all headers and trailers are repeated once again to ensure rapid access and the process ended with a central directory, i.e. a central index, which refers to the start of the list. In order to also enable the building of a ZIP file in further processing, due to the basic structures that in spatial terms can be very extensive and can contain a plurality of systems; the header, the contents and the trailer must of course always be linked to the entry for the end of the respective ZIP file. In the querying system, e.g. system A, the linked parts must now be removed and temporarily stored. The remainder is connected to the locally zipped data and to those of the searched systems, and the respective file offsets are stored. The respective ends of the zip file are temporarily stored in the same order in a temporary file or in RAM and the respective contained offset adapted to the content. If the search result is now complete and all relevant data from the query have been chosen by the user, the index, which for example is stored in a temporary file, is still attached. As already explained, the relevant part chosen and merged by the user here is also transmitted directly to the user or to the system employer by the user. As earlier with recovery, in this way the computing power and the bandwidth are used vary efficiently and the most convenient solution to the problem of secure searching, finding, reproducing, recovering, and/or exporting is offered to the user.

With the inventive method it is now therefore possible for the first time to secure a query 1 from each individual system in a network of systems that work independently and are identical in terms of scope, joined together in a network, however without central organizational structures such as for example a server or similar, and to initiate encrypted searching, finding, reproducing, recovering, and/or exporting of electronic data in all other systems. Due to the design of the method the respective individual system can at any time be exchanged, expanded, or removed from the network while maintaining local continuity. This of course brings considerable advantages with respect to maintenance and service of the system network.

Using the inventive method it is now possible for the first time to guarantee the secure searching, finding, reproducing, recovering, and/or exporting of electronic data without regard to location, i.e. in a location-independent manner, and moreover to limit bandwidth-use to the minimum required and minimize superfluous data exchange.

REFERENCE NUMBER LIST

A System A
DA Data access layer system A
1A/PA Presentation layer system A
2A Other components system A; e.g. archiving
3A Database system A
4A Search server system A
5A Indexing system A
6A Index system A
B System B
DB Data access layer system B
1B/PB Presentation layer system B
2B Other components system B; e.g. archiving
3B Database system B
4B Search server system B
5B Indexing system B
6B Index system B
(1) Query from system A to system B
(2) Query from system B to system A

The invention claimed is:

1. A method for secure searching, finding, reproducing, recovering, and exporting of electronic data from at least two systems that are in a network, identical in functional scope, and decentrally organized, the method comprising the following steps:
   providing each of the system layers with a layer model comprising a respective presentation layer and a respective data access layer;
   providing an encrypted search query for requested data from one of at the least two systems to the other of the at least two systems,
   authenticating the one querying system and a user, by the presentation layer of the other queried system,
   storing in each of the systems a respective system certificate and a configuration table providing information about all other systems in the network and information concerning authorizations of the users,
   authenticating the individual systems via the system certificates of each of the systems,
   carrying out the query by authorizing the one querying system with an authorization listed in the configuration table stored on the other queried system, thereby obtaining requested results,
   checking, encrypting, and transmitting the requested results of the query to the one querying system, and
   displaying and further processing the requested results at the one querying system.

2. The method according to claim 1, wherein a serial number of each system is embedded in the respective system certificate.

3. The method according to claim 2, further comprising the step of:
   specifying and managing by the manufacturer the system certificates and the serial numbers of the systems.

4. The method according to claim 1, further comprising the step of:
   authenticating the one querying system only by the other queried system.

5. The method according to claim 1, further comprising the step of, when there is a search query between the systems,
   transmitting any attachments to the one querying system only after a dedicated request is made by the user.

6. The method according to claim 1, wherein the systems are exchangeable, and it is possible at any given time, provided administrative privileges are available, to insert systems into the network or remove systems from the network.

7. The method according to claim 6, wherein when a system in the network is replaced, adjustments with respect to configuration are not needed to any other system located in the network in order to maintain the security settings and trust relationships between the systems remaining in the network.

8. The method according to claim 1, wherein when the query is successfully ended, even if a system does not react to the query within a minimum reaction time, the available query results are then further processed.

9. The method according to claim 1, wherein compromising of an individual system results only in an access at a same authorization level so that the system as a whole remains secure despite the compromising.

10. The method according to claim 1, wherein there is no limitation to only one programming platform, and the claimed method is platform- and interface-independent.

11. The method according to claim 1, further comprising the step of:
    immediately displaying the requested data to the one querying system and simultaneously further processing the search query made.

12. The method according to claim 1, further comprising the step of:
    specifying each search query in terms of Boolean algebra.

13. The method according to claim 1, further comprising the step of:
    assigning hierarchic, unique access rights via a corresponding administration.

14. The method according to claim 1, further comprising the step of:
    using contents of file attachments, if present, as part of the query.

15. The method according to claim 1, further comprising the step of:
    weighting the displayed result using corresponding score values.

* * * * *